United States Patent [19]

Eldridge

[11] Patent Number: 5,613,018
[45] Date of Patent: Mar. 18, 1997

[54] PAGE BUFFER ROTATOR

[75] Inventor: George L. Eldridge, Long Beach, Calif.

[73] Assignee: Xerox Corporation, Stamford, Conn.

[21] Appl. No.: 567,497

[22] Filed: Dec. 1, 1995

Related U.S. Application Data

[63] Continuation of Ser. No. 83,248, Jun. 29, 1993, abandoned, which is a continuation-in-part of Ser. No. 811,854, Dec. 23, 1991, abandoned.

[51] Int. Cl.$^6$ ...................................................... G06R 9/32
[52] U.S. Cl. ............................................ 382/296; 395/137
[58] Field of Search .................................. 382/296, 297, 382/289, 290, 305; 395/137; 345/126

[56] References Cited

U.S. PATENT DOCUMENTS

| | | | |
|---|---|---|---|
| 4,635,212 | 1/1987 | Hatazawa | 382/44 |
| 4,806,920 | 2/1989 | Sawada | 345/126 |
| 4,894,646 | 1/1990 | Ryman | 345/126 |
| 4,995,089 | 2/1991 | Altrieth, III | 382/46 |
| 5,034,733 | 7/1993 | Okazawa et al. | 345/126 |
| 5,111,192 | 5/1992 | Kadakia | 345/126 |

OTHER PUBLICATIONS

Ralston et al "Encyclopedia of Computer Science" 3rd Edition, Van Nostrand Reinhold, ©1976 pp. 1420–1423.

*Primary Examiner*—Joseph Mancuso
*Attorney, Agent, or Firm*—Robert Cumha

[57] ABSTRACT

A circuit for performing high-speed 90 and 270 degree rotations of an uncompressed image in a page buffer. The rotation is performed as the data is written into and read from the page buffer, thus requiring no additional time. A special memory mapping technique is used to make efficient use of the page buffer memory.

4 Claims, 13 Drawing Sheets

| 15 | 31 | 47 | 63 | 79 | 95 | 111 | 127 | 143 | 159 | 175 | 191 | 207 | 223 | 239 | 255 |
|----|----|----|----|----|----|-----|-----|-----|-----|-----|-----|-----|-----|-----|-----|
| 14 | 30 | 46 | 62 | 78 | 94 | 110 | 126 | 142 | 158 | 174 | 190 | 206 | 222 | 238 | 254 |
| 13 | 29 | 45 | 61 | 77 | 93 | 109 | 125 | 141 | 157 | 173 | 189 | 205 | 221 | 237 | 253 |
| 12 | 28 | 44 | 60 | 76 | 92 | 108 | 124 | 140 | 156 | 172 | 188 | 204 | 220 | 236 | 252 |
| 11 | 27 | 43 | 59 | 75 | 91 | 107 | 123 | 139 | 155 | 171 | 187 | 203 | 219 | 235 | 251 |
| 10 | 26 | 42 | 58 | 74 | 90 | 106 | 122 | 138 | 154 | 170 | 186 | 202 | 218 | 234 | 250 |
| 9  | 25 | 41 | 57 | 73 | 89 | 105 | 121 | 137 | 153 | 169 | 185 | 201 | 217 | 233 | 249 |
| 8  | 24 | 40 | 56 | 72 | 88 | 104 | 120 | 136 | 152 | 168 | 184 | 200 | 216 | 232 | 248 |
| 7  | 23 | 39 | 55 | 71 | 87 | 103 | 119 | 135 | 151 | 167 | 183 | 199 | 215 | 231 | 247 |
| 6  | 22 | 38 | 54 | 70 | 86 | 102 | 118 | 134 | 150 | 166 | 182 | 198 | 214 | 230 | 246 |
| 5  | 21 | 37 | 53 | 69 | 85 | 101 | 117 | 133 | 149 | 165 | 181 | 197 | 213 | 229 | 245 |
| 4  | 20 | 36 | 52 | 68 | 84 | 100 | 116 | 132 | 148 | 164 | 180 | 196 | 212 | 228 | 244 |
| 3  | 19 | 35 | 51 | 67 | 83 | 99  | 115 | 131 | 147 | 163 | 179 | 195 | 211 | 227 | 243 |
| 2  | 18 | 34 | 50 | 66 | 82 | 98  | 114 | 130 | 146 | 162 | 178 | 194 | 210 | 226 | 242 |
| 1  | 17 | 33 | 49 | 65 | 81 | 97  | 113 | 129 | 145 | 161 | 177 | 193 | 209 | 225 | 241 |
| 0  | 16 | 32 | 48 | 64 | 80 | 96  | 112 | 128 | 144 | 160 | 176 | 192 | 208 | 224 | 240 |

FAST SCAN
(Y DIRECTION)

SLOW SCAN
(X DIRECTION)

—— REGULAR
--- ROTATED

| 4 | 20 | 36 | 52 | 68 | 84 | 100 | 116 | 132 | 148 | 164 | 180 | 196 | 212 | 228 | 244 |
|---|----|----|----|----|----|-----|-----|-----|-----|-----|-----|-----|-----|-----|-----|
| 3 | 19 | 35 | 51 | 67 | 83 | 99  | 115 | 131 | 147 | 163 | 179 | 195 | 211 | 227 | 243 |
| 2 | 18 | 34 | 50 | 66 | 82 | 98  | 114 | 130 | 146 | 162 | 178 | 194 | 210 | 226 | 242 |
| 1 | 17 | 33 | 49 | 65 | 81 | 97  | 113 | 129 | 145 | 161 | 177 | 193 | 209 | 225 | 241 |
| 0 | 16 | 32 | 48 | 64 | 80 | 96  | 112 | 128 | 144 | 160 | 176 | 192 | 208 | 224 | 240 |

| 4 | 20 | 36 | 52 | 68 | 84 | 100 | 116 | 132 | 148 | 164 | 180 |
|---|----|----|----|----|----|-----|-----|-----|-----|-----|-----|
| 3 | 19 | 35 | 51 | 67 | 83 | 99  | 115 | 131 | 147 | 163 | 179 |
| 2 | 18 | 34 | 50 | 66 | 82 | 98  | 114 | 130 | 146 | 162 | 178 |
| 1 | 17 | 33 | 49 | 65 | 81 | 97  | 113 | 129 | 145 | 161 | 177 |
| 0 | 16 | 32 | 48 | 64 | 80 | 96  | 112 | 128 | 144 | 160 | 176 |

PAGE BUFFER ROTATOR

This is a continuation of application Ser. No. 08/083,248, filed Jun. 29, 1993, now abandoned, which application is a continuation-in-part of, coassigned U.S. patent application Ser. No. 07/811,854 of George L. Eldridge, entitled "PAGE SUFFER ROTATOR," filed Dec. 23, 1991, now abandoned.

BACKGROUND OF THE INVENTION

Some printing features such as signature printing require that an image be rotated by 90 degrees. The simplest method of performing a rotation would be to have a page buffer constructed of a two-dimensional memory array that could be addressed by column or by row. The data would be written into the buffer with the words along the column direction and then read out with the words along the row direction.

This rotation could be considered to take zero time since the same number of read and write operations must be performed as with an unrotated image. The only thing that must be done is to change the mode of memory from column mode to row mode (i.e. rotated mode). Also, by changing the mode of the memory while loading objects into the buffer, images may be constructed of rotated and unrotated objects. Unfortunately, the memory devices needed to build a page buffer with both row and column access do not yet exist commercially.

Some inventions handle this requirement by the provision of a specially designed memory which can read in the image data words in one direction and read out in an orthogonal direction. However, such special purpose memories are expensive, and tend to have small capacities.

A method and circuit for producing these rotations at high speed without the necessity of special memory hardware is described in commonly owned patent applications Ser. No. 07/453,738 entitled "Method To Rotate A Bitmap Image 90 Degrees" and Ser. No. 07/721,797, "Parallel Rotation Algorithm", which are incorporated by reference herein. In its simplest form, this prior invention can be described with reference to a 4 by 4 bit block of binary pixels in memory arranged as four horizontal words of four bits each, which must be rotated 90 degrees. See FIGS. 1 through 4 of the above mentioned "Method To Rotate A Bitmap Image 90 Degrees" patent application.

The method can be explained as the addition of the rotation of the bits within each 4 by 4 bit block and the rotation of the blocks of the whole image. To rotate bits within a block, the first 4 bit word is loaded into the first line of a 4 by 4 bit buffer. The next word is circularly rotated upward one bit and loaded into the second line of the buffer. The third word is circularly shifted two bits and loaded into the third line of the buffer and the fourth line is circularly shifted three bits and loaded into the fourth line of the buffer. At this point a vertical line in the original image is still a vertical line in the buffer, but a horizontal line in the original is now a diagonal line in the buffer.

Since the buffer is implemented from "by 1" devices, any bit in each device is addressable independently of the other devices, and a bit in one word in the buffer can be loaded into any bit of the four words of memory. Therefore, if the bits in the buffer are addressed along diagonal lines parallel to the diagonal line in the buffer and loaded into single words of the memory, the diagonal line in the buffer will become a vertical line at the output. Continuing with addressing the bits along diagonal lines, the vertical line in the buffer will become a diagonal line at the output. The output four words, prior to storage in memory, are shifted to line up the diagonal bits into a horizontal line. Since this line started as a vertical line, it can be seen that the 4 by 4 bit block has now been completely rotated 90 degrees. To rotate the blocks within the image, a simple addressing algorithm provides that the blocks read out of the block buffer are read in the correct sequence.

This method requires the number of bits in each row and column to be equal and to be a power of two. With an image assumed to be 12,288 bits per line by 5,122 lines before rotation, the page buffer needs an address space of 256 Megabits, arranged as 16,384 pixels by 16,384 lines. However, only 64 Megabits of memory are needed at any one given time to store the image. It would be a significant improvement if the number of blocks of buffer memory required to rotate an image could be reduced to the number of blocks actually required to store the image, regardless of the image shape.

SUMMARY OF THE INVENTION

This invention accomplishes the desired result by providing a virtual address space of 256 Megabits, mapped into a real memory of 64 Megabits. Each memory device is assumed to be a 1 Megabit by 1 bit DRAM, and each block of memory is 1,024 bits square. The image lines are read into the current block, line by line. Assuming 12,288 bits per image line, the first image line will be stored in the first line of the first 12 blocks, and the next image line will start again at the start of the second line of the first block.

A counter is used to count the image bits. When the unrotated image data is read out of the buffer, the counter must jump to the start of the next line after each 12,288 bits. Similarly, when reading out a rotated image the counter must start the next line after 5,120 bits. The image rotation is performed at the maximum rate that data can be read into and out of the page buffer, and therefore takes no more time than is taken by a page buffer that does not have the capacity to rotate an image.

The invention, in its broadest and most general form, may be described as a buffer memory which can be used for the rotation of an image of any shape, provided only that the number of blocks in the image does not exceed the number of equally sized blocks in the buffer. This process can be thought of as a combination of two independent processes. The first is the rotation of the data within each block, and is the prior art process of first shifting, reorganizing and second shifting the data internal to each block. The second step is the use of some kind of addressing mechanism, software or hardware, to indicate where each block, now internally rotated, of the original image is to be placed in the final image. This specification describes one particular hardware solution to this problem involving the redistribution of address bits, but any other method including the logical equation approach similar to the one used in the patents incorporated by reference could also be used.

DETAILED DESCRIPTION OF THE INVENTION

Figure 1:
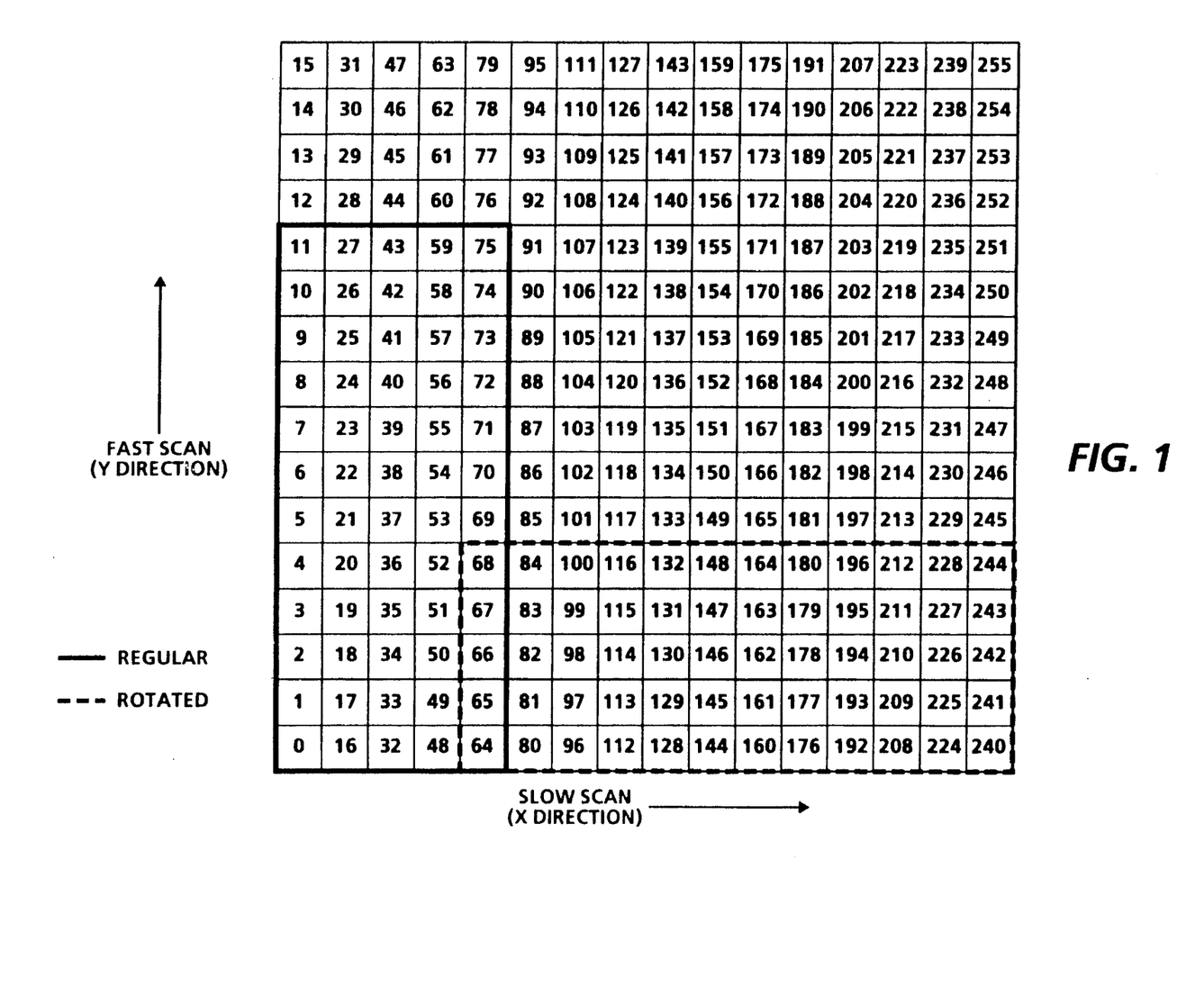
FIG. 1 shows the arrangement of the virtual memory with rotated and unrotated images.
Figure 2:
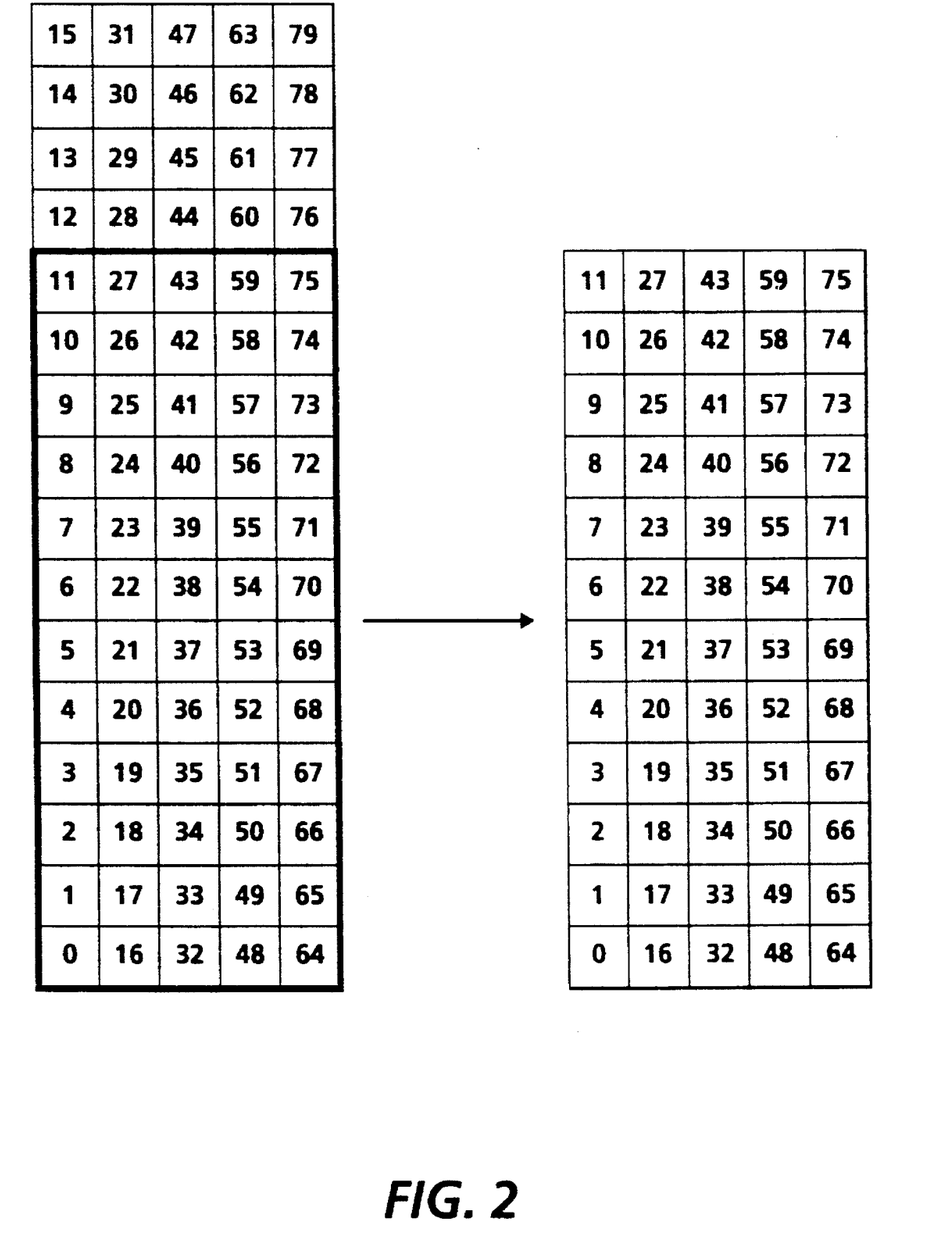
FIG. 2 shows the mapping of virtual to real blocks for the unrotated image of FIG. 1.
Figure 3:
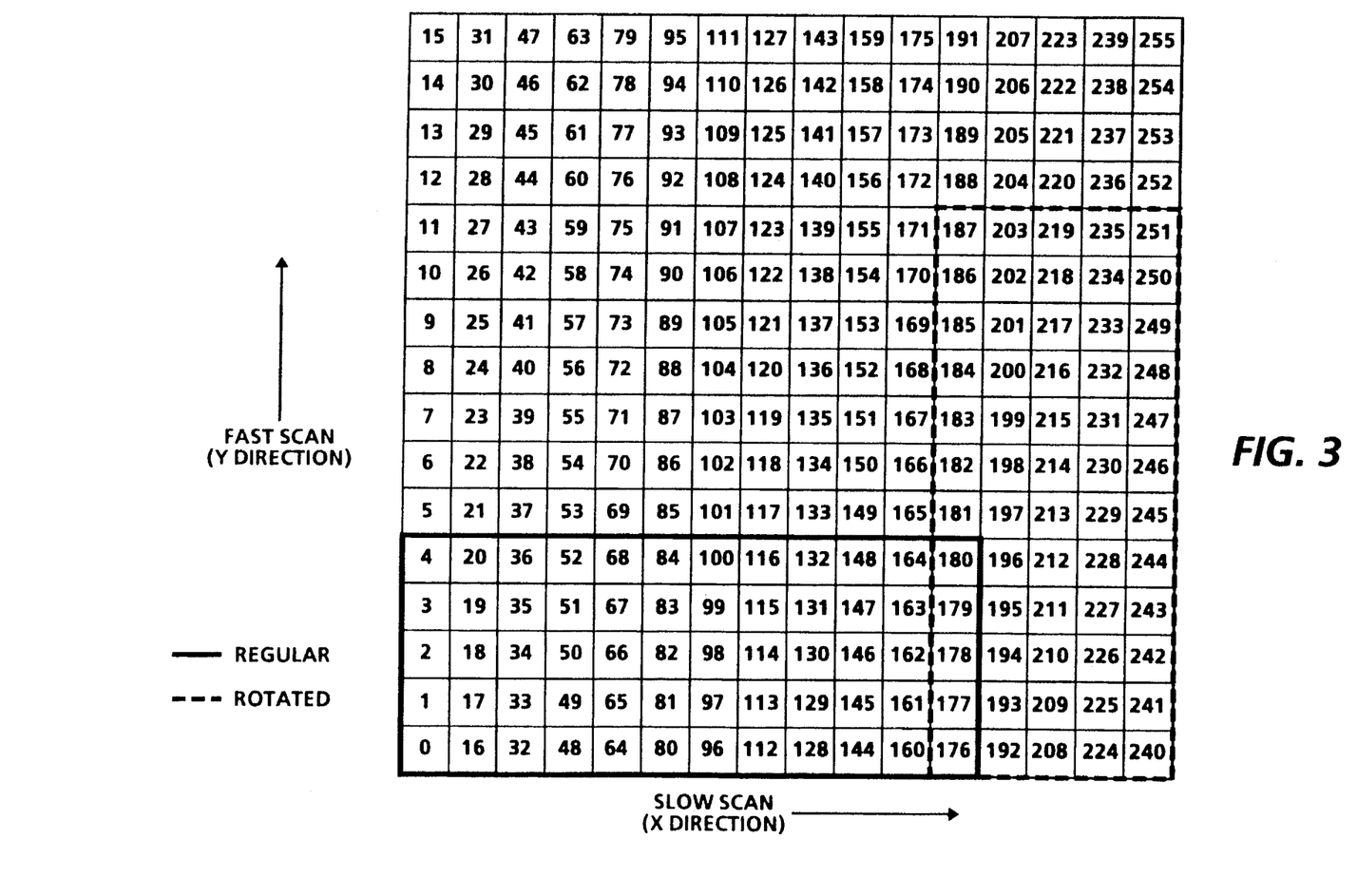
FIG. 3 shows a different arrangement of rotated and unrotated images in virtual memory.
Figure 4:
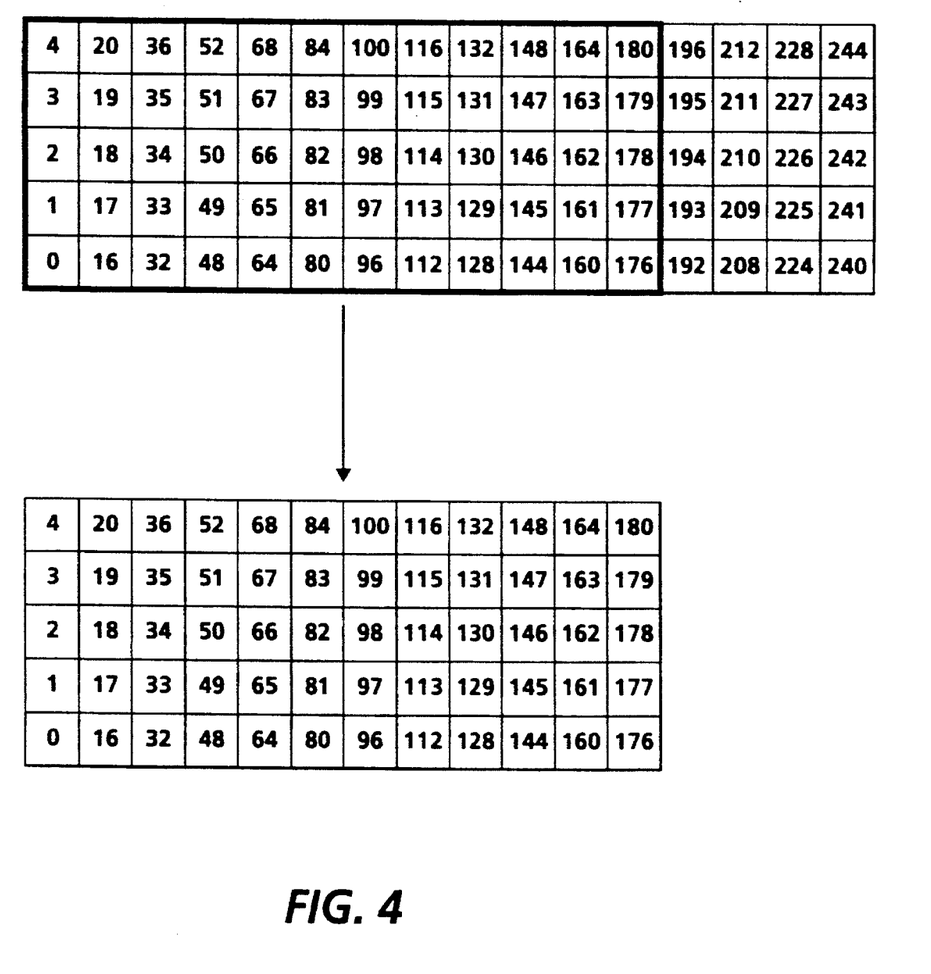
FIG. 4 shows the mapping of virtual to real blocks for the unrotated image of FIG. 3.

The arrangement of the virtual memory is shown in FIG. 1. These virtual blocks are mapped into blocks of real memory with an address translation PROM. FIG. 2 shows the mapping of virtual blocks to real blocks for the unrotated area of 12,288 bits by 5,120 lines. There would also be a similar map for a rotated image, as shown in FIGS. 3 and 4. A third mode could be for an image 8,192 bits square, not shown.

The preceding example was specifically for a page bitmap that is 5 blocks in width and 12 blocks in length. The general case is as follows:

Assume a page bitmap that is L blocks in length and W blocks in width. The blocks are stored in memory in sequence in columns. Assuming that the blocks are labeled starting with zero (0), the image is stored with blocks 0 through L-1 in the first column. The second column has blocks L through (2'L)-1. This pattern continues to the last column which has blocks (W-1)*L through (W'L)-1.

The rotation algorithm requires that the column length be an integer power of two (2) in length. The following mapping algorithm will satisfy that requirement.

The first column of blocks is accessed as block 0 through L-1; this is the same as the unmapped blocks. The second column of blocks, L through (2'L)-1, is accessed as blocks M through M +L-1, where M is the least power of two (2) greater than or equal to L.

The third column of blocks, 2*L through (3'L)-1, is accessed as blocks 2*M through (2*M)+L-1. This pattern continues to the last column which has blocks (W1)*L through (W*L)-1 accessed as blocks (W-1)*M through ((W-1)*M)+L-1.

The mapping is:

| Column | Unmapped | Mapped |
| --- | --- | --- |
| 1 | 0 | 0 |
| 1 | 1 | 1 |
| . | . | . |
| . | . | . |
| . | . | . |
| 1 | L – 1 | L – 1 |
| 2 | L | M |
| 2 | L + 1 | M + 1 |

-continued

| Column | Unmapped | Mapped |
| --- | --- | --- |
| . | . | . |
| . | . | . |
| . | . | . |
| 2 | (2*L) – 1 | M + L – 1 |
| . | . | . |
| . | . | . |
| . | . | . |
| W – 1 | (W – 1)*L | (W – 1)*M |
| W – 1 | ((W – 1)*L) + 1 | ((W – 1)*M) + 1 |
| . | . | . |
| . | . | . |
| . | . | . |
| W – 1 | (W*L) – 1 | ((W – 1)*M) + L – 1 |

There would be a similar mapping for a rotated image.

Figure 5:
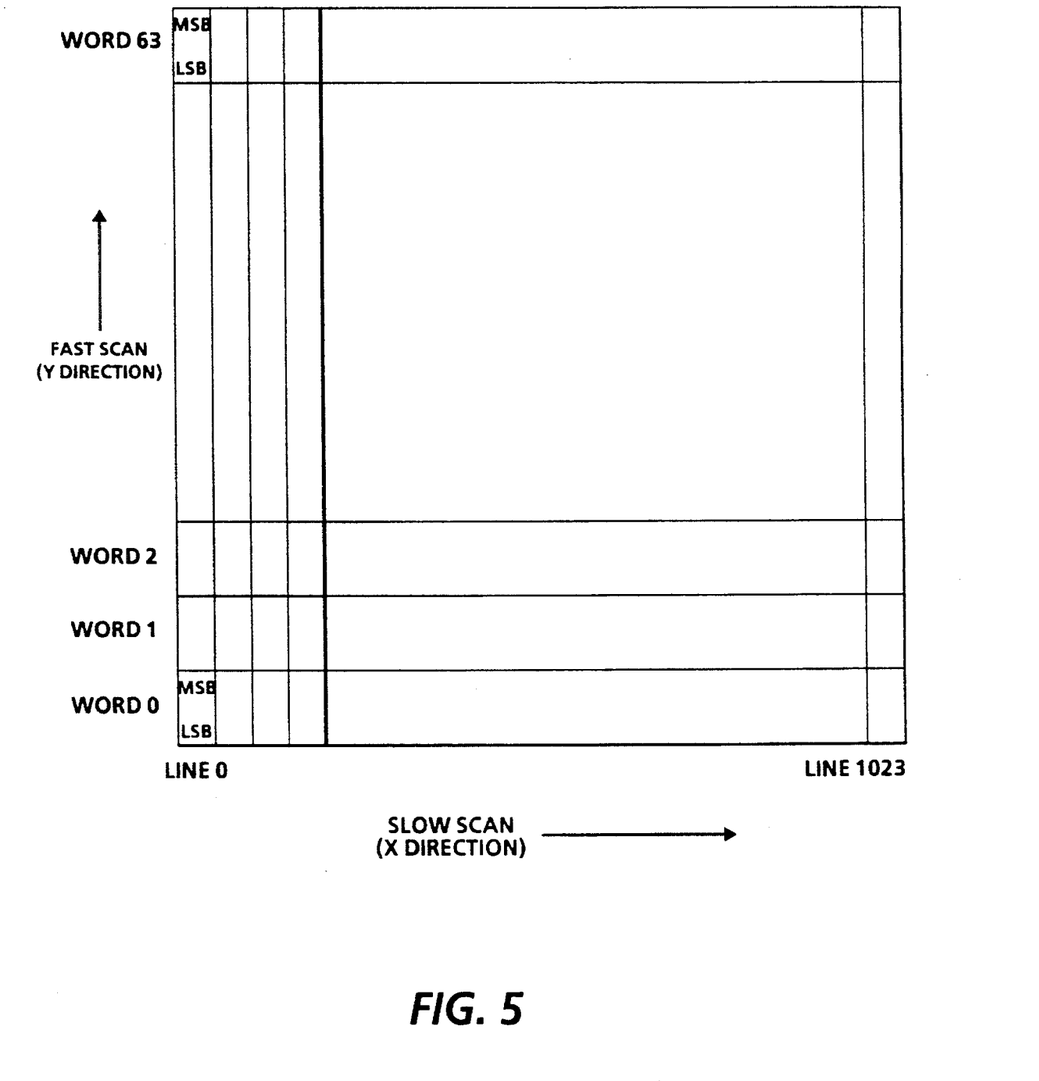
FIG. 5 is the layout of an individual block.

The layout of an individual block is shown in FIG. 5. Each word is 16 bits, and each bit resides in a different DRAM device. In other words, device #1 will store bit 0 of all 64 words of all 1024 lines in the block, device #1 will store bit 1 of all 64 words of all 1024 lines in the block, etc. In terms of FIGS. 6 and 7, for example, the contents of a single device would appear as horizontal lines.

Figure 6:
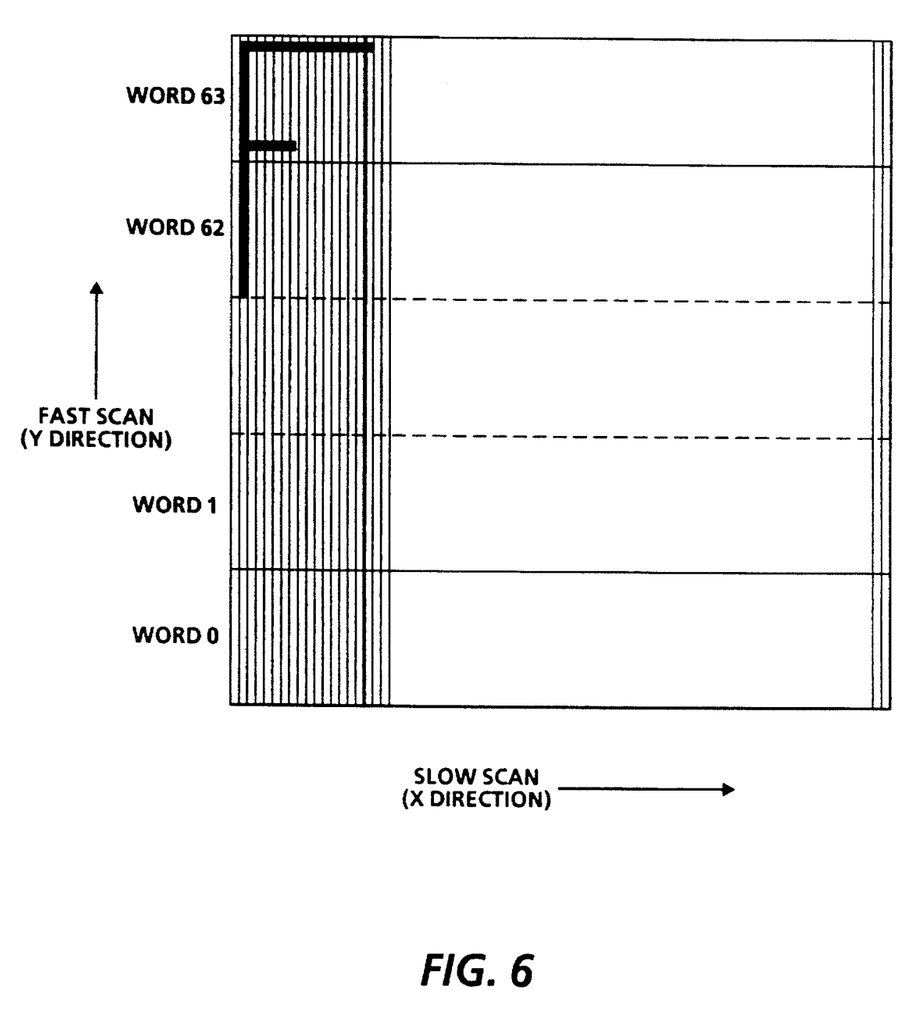
FIG. 6 shows how an unrotated image is stored in a memory block.
Figure 7:
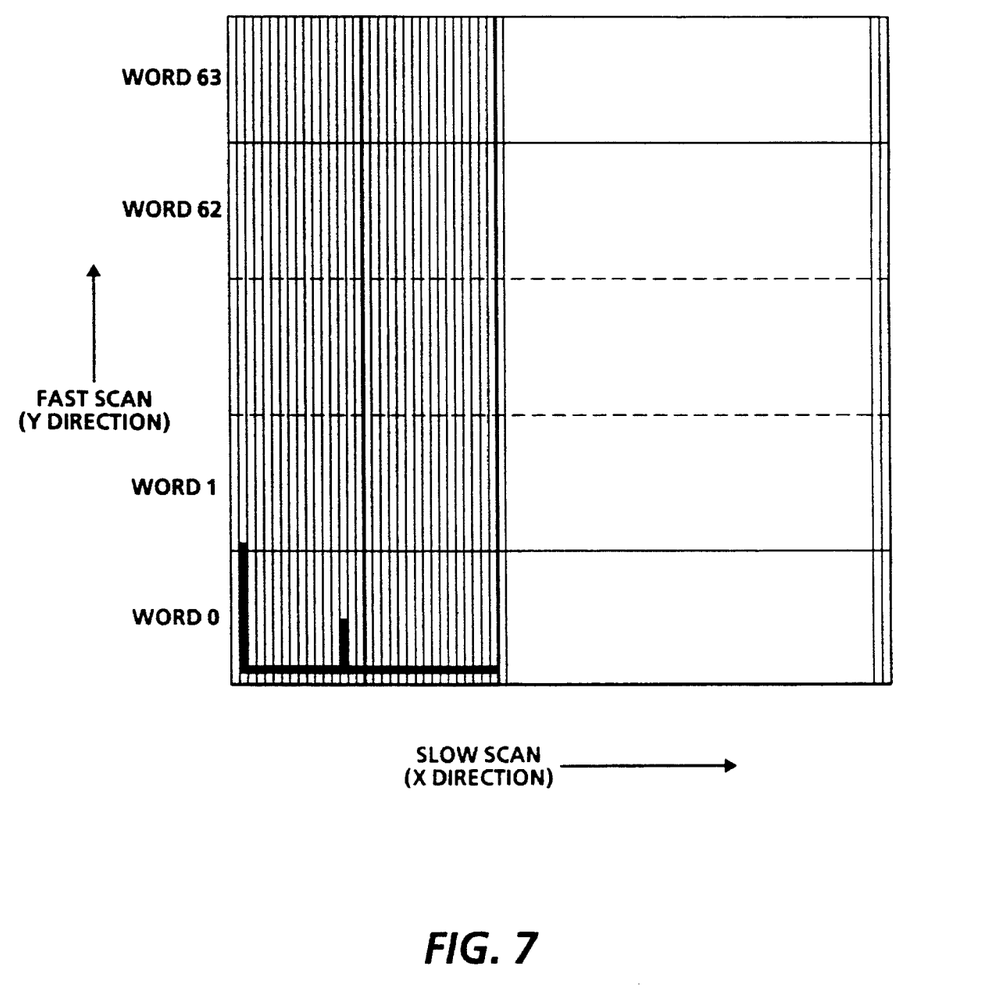
FIG. 7 shows how a rotated image is stored in a memory block.

The primary problem with rotation is that a line that is completely contained in one DRAM device in the unrotated buffer must be spread across 16 words in the rotated buffer. This can be seen by comparing FIGS. 6 and 7. In FIG. 6 the bits forming the top horizontal part of the letter "F" all reside in the same device. In FIG. 7 the same top portion of the letter is spread across 16 devices, from bit 1 of word 0 to bit 0 of word 1. The brute force method of rotation would require 16 read operations of the device in FIG. 6 to get the bits that form the word in the rotated direction. The solution to the problem used here is to arrange the data, as it is read into the page buffer, so that each of the bits is in a different device. This is done by circularly shifting each word by the word number, mod 16, "scanline mod 16", to the right (toward the LSB). In other words, the bits of word 0 are shifted 0 bits into device 0, word 1 is shifted 1 bit into device 1, ... word 15 is shifted 15 bits into device 15, word 16 is shifted 0 bits into device 0, etc. Now, since every device is individually addressable, each bit of the word is also individually addressable. The data can now be either rotated or returned to its original form if rotation is not needed. To return the image to its original form the data is simply read out and shifted back.

To rotate the image, each device must be individually addressed. Since 16 devices are required to store one word, there are four address bits that are different for each RAM device, but the address bits are multiplexed, so only two physical lines need to be run radially to each device. The remaining address lines are common to all the RAM's.

To read or write in the rotated mode, address translation is performed. It is possible to translate a virtual page buffer address with rotation into a real address through logical operations on the address. One arithmetic operation is required to calculate the value of the radial address lines that go to each RAM. For a read operation the 16 bits read from the RAM's must be rotated to the right the distance of "scanline mod 16" and then the word must be reversed (bit 15 becomes bit 0, etc.). The resulting data is the 16-bit word in the rotated direction. For a write operation the process is reversed.

Figure 8:
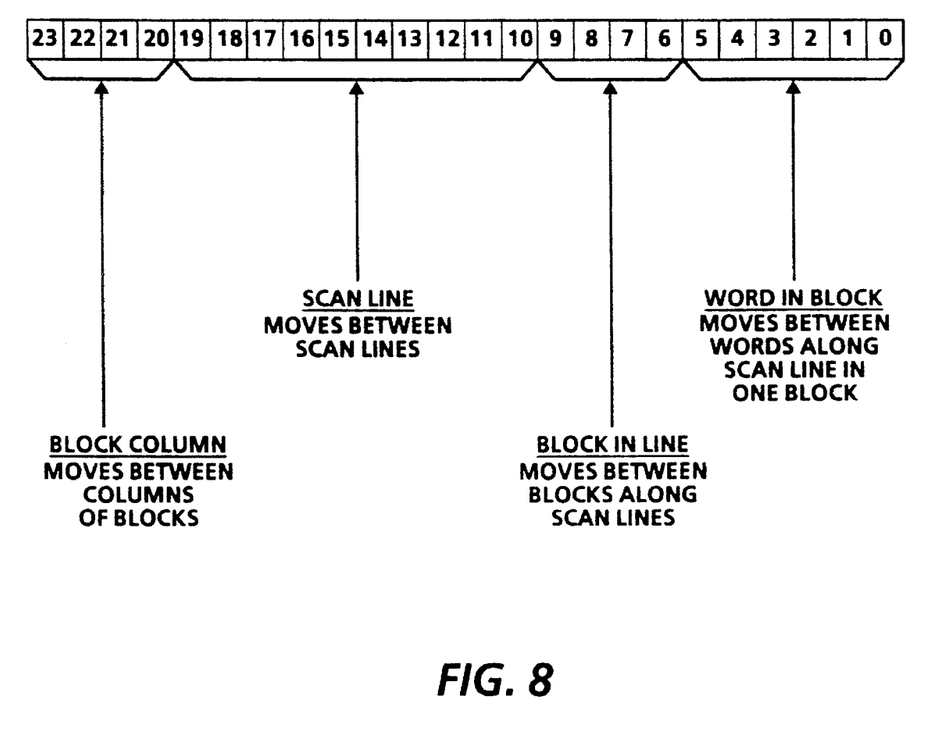
FIG. 8 shows the origin of the data in the address fields.
Figure 9:
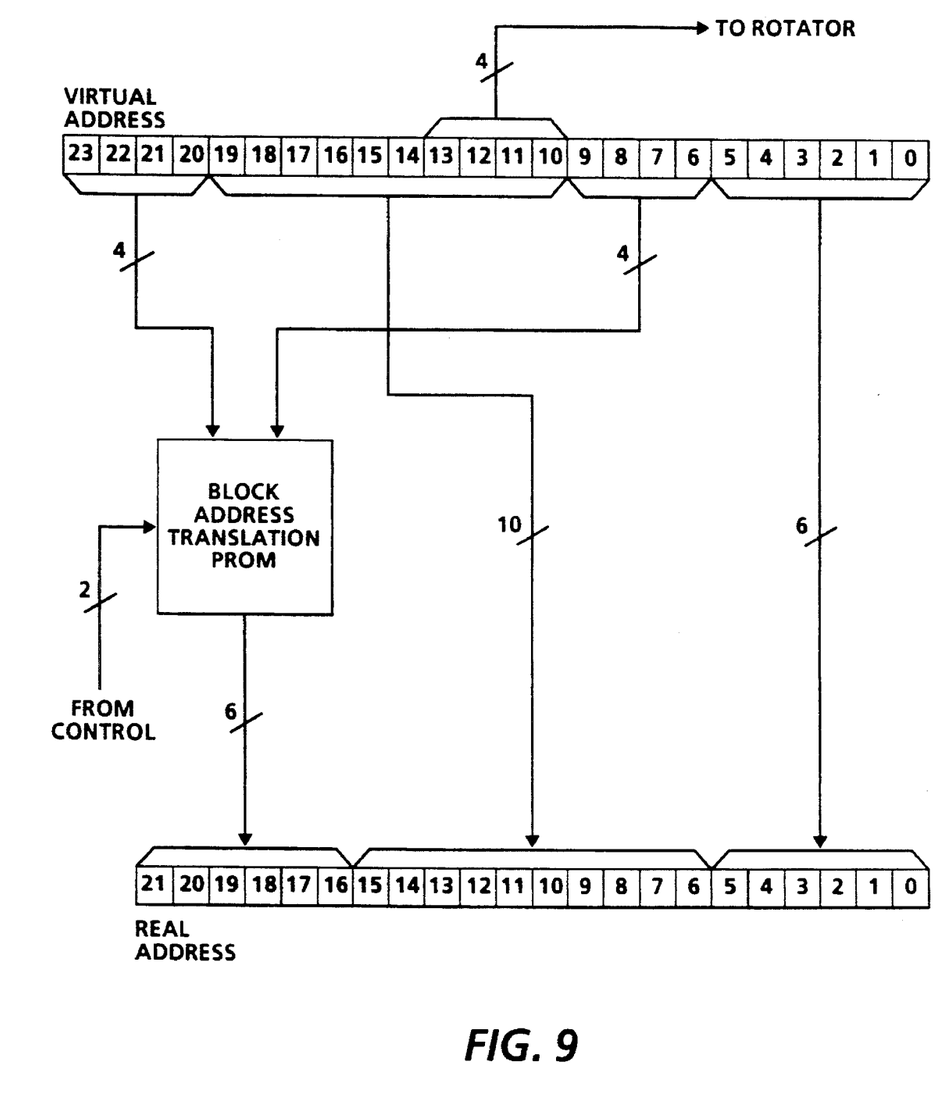
FIG. 9 shows the mapping between a 24-bit virtual address and a 22-bit real address for an unrotated image.
Figure 10:
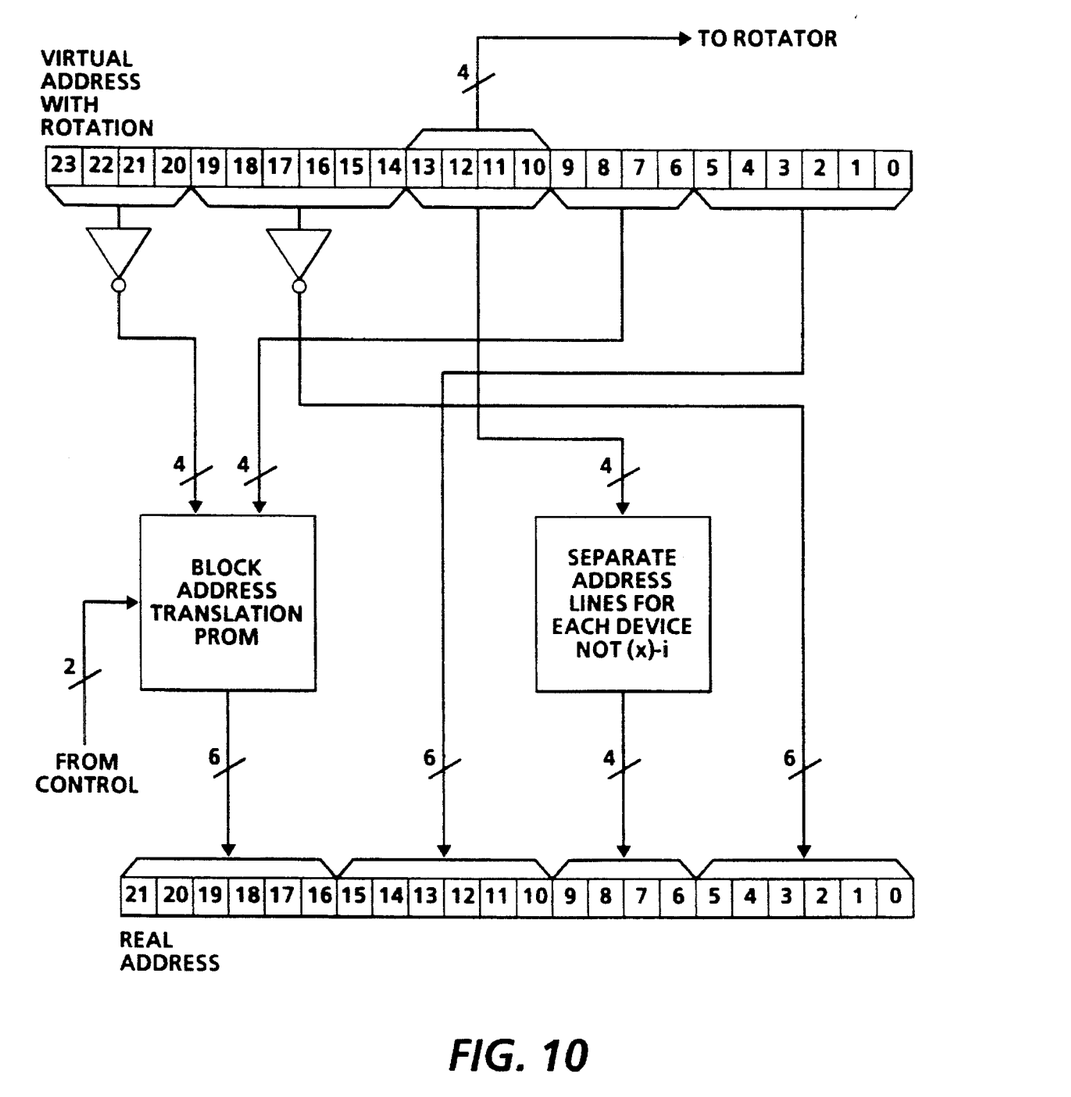
FIG. 10 shows the mapping between a 24-bit virtual address and a 22-bit real address for a rotated image.

The virtual address of any word in the page buffer is composed of a number of fields as indicated in FIG. 8. The virtual address is as 24-bit address. Mapping of the 24-bit virtual address to a 22-bit real address is performed by the method presented in FIG. 9. For a virtual address with rotation, the method of FIG. 10 is used.

Figure 11:
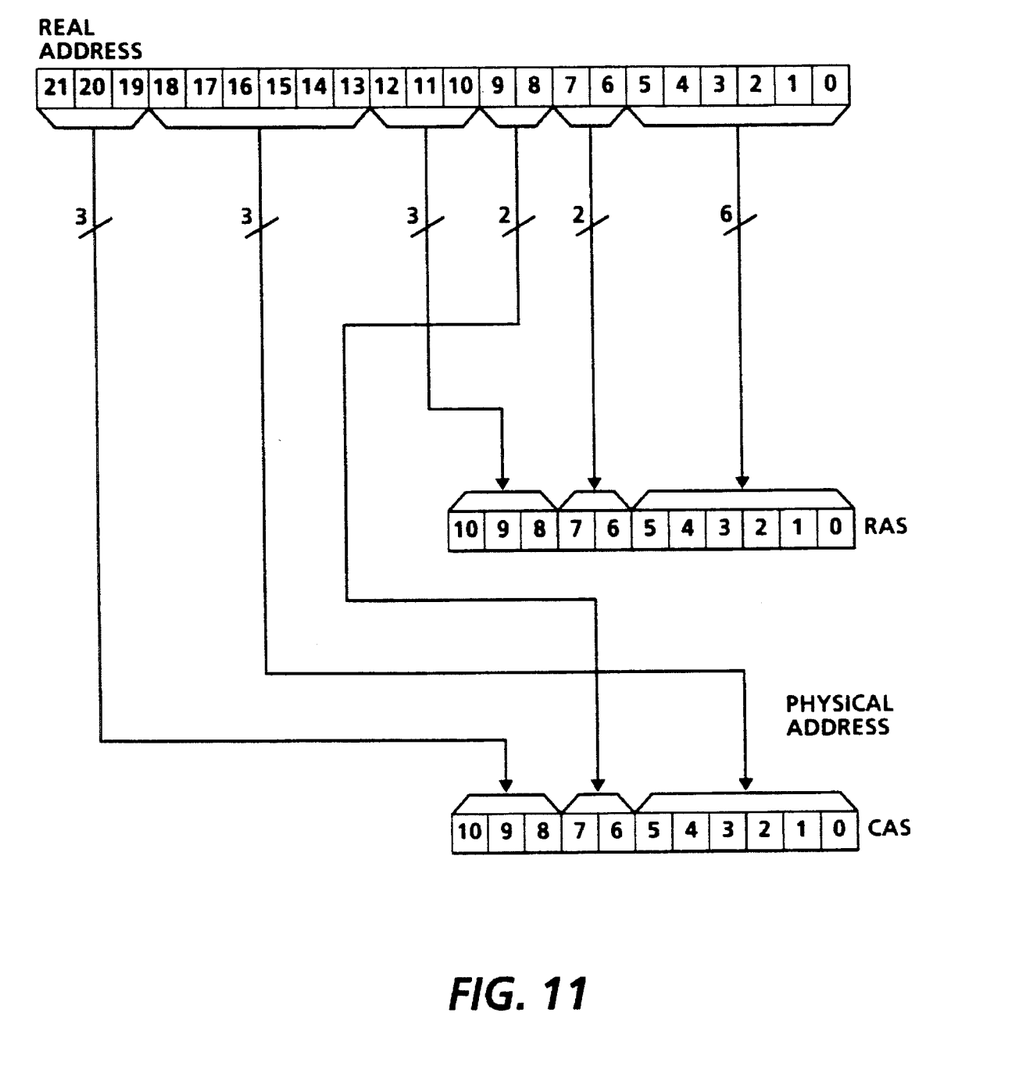
FIG. 11 shows the most efficient mapping of the real address for the RAM devices.

The most efficient mapping of the real address for the RAM devices is described in FIG. 11. This mapping places the four address bits that must be different for each RAM on two bits of the CAS (column address). This method requires only two radial lines for each RAM.

Figure 12:
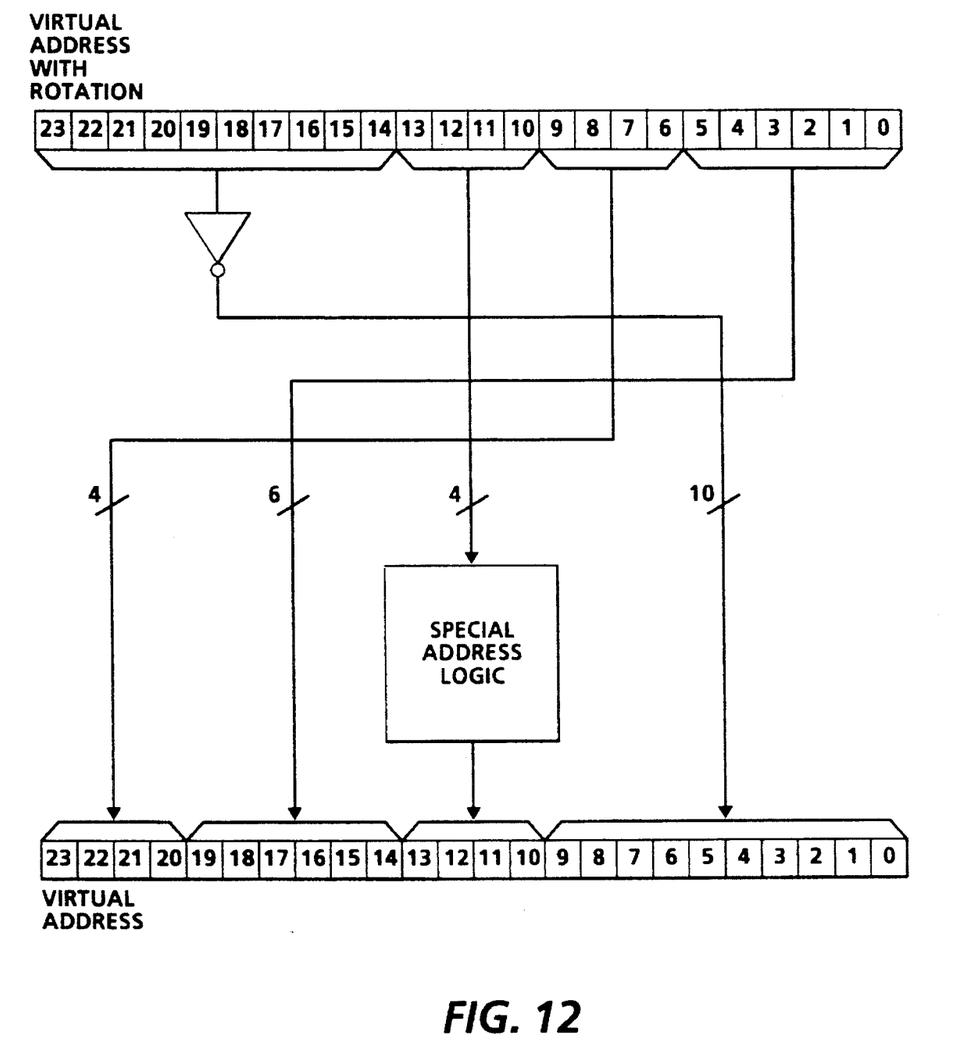
FIG. 12 shows the mapping of a virtual address with rotation to a virtual address without rotation.

The mapping of a virtual address with rotation to a virtual address without rotation is shown for reference in FIG. 12.

The 256 1K×1K blocks that make up the page buffer can be arranged in rectangular areas. The following table shows all of the combinations available when using 64 blocks of real memory (64 Megabits). A size of 5×12 has been chosen for the following example.

| Blocks | Inches at 600 spi |
|--------|-------------------|
| 1 × 64 | 1.71" × 109.23" |
| 2 × 32 | 3.41" × 54.61" |
| 3 × 21 | 5.21" × 35.84" |
| 4 × 16 | 6.83" × 27.31" |
| 5 × 12 | 8.53" × 20.48" |
| 6 × 10 | 10.24" × 17.07" |
| 7 × 9  | 11.95" × 15.36" |
| 8 × 8  | 13.65" × 13.65" |

The mapping uses a PROM. For 3 different mappings such as a 5×12, 12×5 and 8×8, 2 bits of control are required for the PROM. Add to that the 8 bits that describe the 256 virtual blocks, and a 1K by 6 bit PROM with fast access is needed. The address bits from the PROM go to the CAS address to "hide" the access time of the PROM.

It is possible to use smaller size blocks. Using 512 bits by 512 line blocks would give slightly better control of the rectangular image size. However, 256 real blocks in a space of 1,024 virtual blocks would be needed. This would require a 4K by 8 bit PROM mapping.

The rotation method presented will perform a 90 degree rotation of an image at the full speed of operation of the memory. Using this rotation in conjunction with the X and Y direction controls of the virtual memory, it is possible to get all four 90-degree rotations and their reflections. If rotation is performed as the data is written into the buffer, then data can be read from the buffer using the nibble mode.

Conceptually, this method operates by "rotating the data halfway" as it is written into the page buffer. For regular operation the data is "rotated back to normal" as it is read back. For rotation operation, the data is "rotated the rest of the way" as it is read out.

If this memory is considered to be a black-box, then it appears to be a two-dimensional memory array that can be accessed either with words along the column direction or with words along the row direction.

Figure 13:
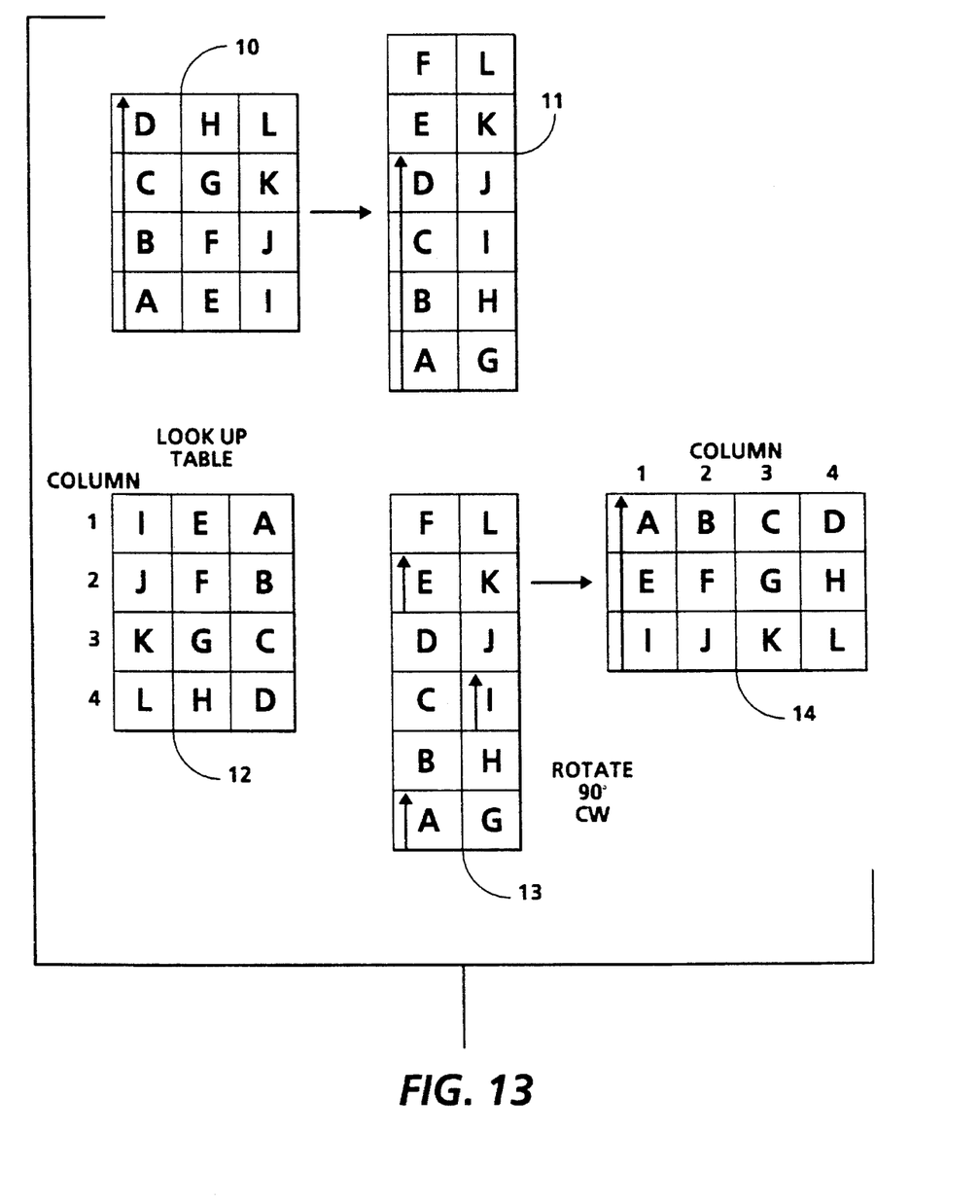
FIG. 13 is a simple embodiment of the invention which uses a table look-up to perform the block rotation.

A method of block rotation using a table look-up is shown in FIG. 13. The image 10 in this example is four blocks by three blocks, labelled A through L, and is received one complete scan line at a time. The first scan line, which extends through blocks A through D is shown as an arrow along the left side of the image. The buffer 11 must have a capacity equal to, or greater than, that required to contain the image, as shown, but does not have to be arranged in any particular arrangement. The scan lines are simply loaded into the buffer blocks in sequential order as shown.

For a particular image size, in this case three by four blocks, and for a specific rotation, in this case clockwise 90 degrees, there will be a specific order in which the buffer must be read out, and this order can be stored in a PROM 12. As shown, column 1 of the output must come from blocks I, E and A, in that order, and this sequence is stored in the first line of the PROM. Thus, as shown, the first scan line of the first output column must taken from blocks I, E and A of the buffer 13 to produce the first scanline of the output image 14.

While the invention has been described with reference to a specific embodiment, it will be understood by those skilled in the art that various changes may be made and equivalents may be substituted for elements thereof without departing from the true spirit and scope of the invention. For example, there may be more than one bit per pixel, in which case several RAM's in parallel or a RAM device more than one bit wide could be used. Circular shifts in different directions and reading or writing sequences proceeding from either end of a block could be used to create different rotations, or mirror images of these rotations. As is shown by the two claims, the image pixels can be rearranged either at the time the data is read into the buffer, or when it is read out. The embodiment shown in the specification assumes a shift from an 8½ by 11 image to one that is 11 by 8½, but the process can be reversed to start with 11 by 8½. Many hardware and software alternatives exist for translating from an unrotated to a rotated block arrangement. In addition, many other modifications may be made without departing from the essential teachings of the invention.

I claim:

1. A method of rotating a rectangular original image comprising a number of image blocks comprising the steps of:

providing a square virtual memory having a number of memory blocks in each direction that is a power of two, said virtual memory being large enough in both length and width to contain said image, providing a real memory which is large enough to contain said number of image blocks, generating a list of corresponding virtual and real block addresses for said rectangular image shape so that all of said image blocks in said virtual memory can be loaded into blocks in said real memory, storing said original image into said virtual memory after completing the generating step, reading each image block from said virtual memory, partially rotating each image block, using said list to load each image block into a block of said real memory, completing the rotation of said image block, and using said list to return each rotated block to said virtual memory.

2. The process of claim 1 wherein a plurality of lists are generated for various image sizes and shapes.

3. The process of claim 1 wherein all addresses generated by said list are column addresses.

4. The process of claim 1 where said list is stored in read only memory.

* * * * *